June 12, 1928.　　　　　T. F. DENMAN　　　　　1,672,930
FRUIT JUICE DISPENSER
Filed April 29, 1927　　　3 Sheets-Sheet 2
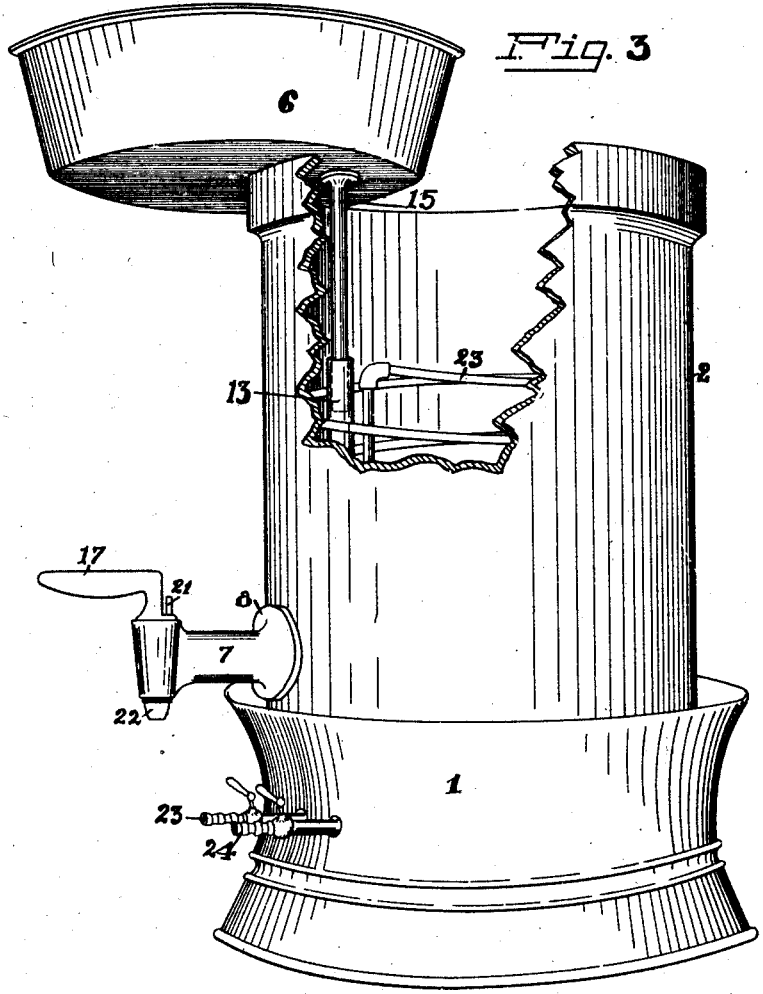
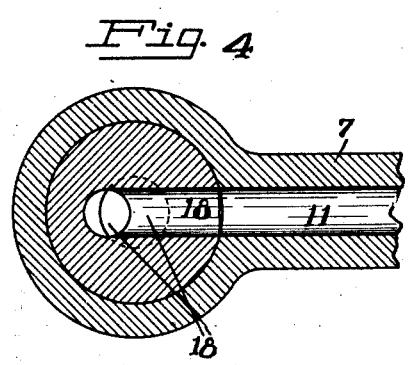
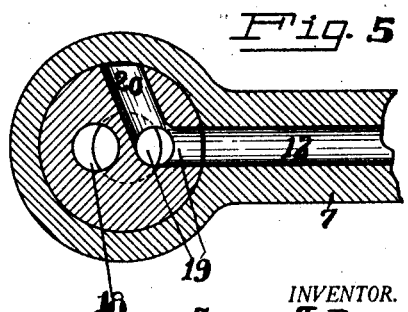
INVENTOR.
Truman F. Denman
BY
J. E. Trabucco
ATTORNEY.

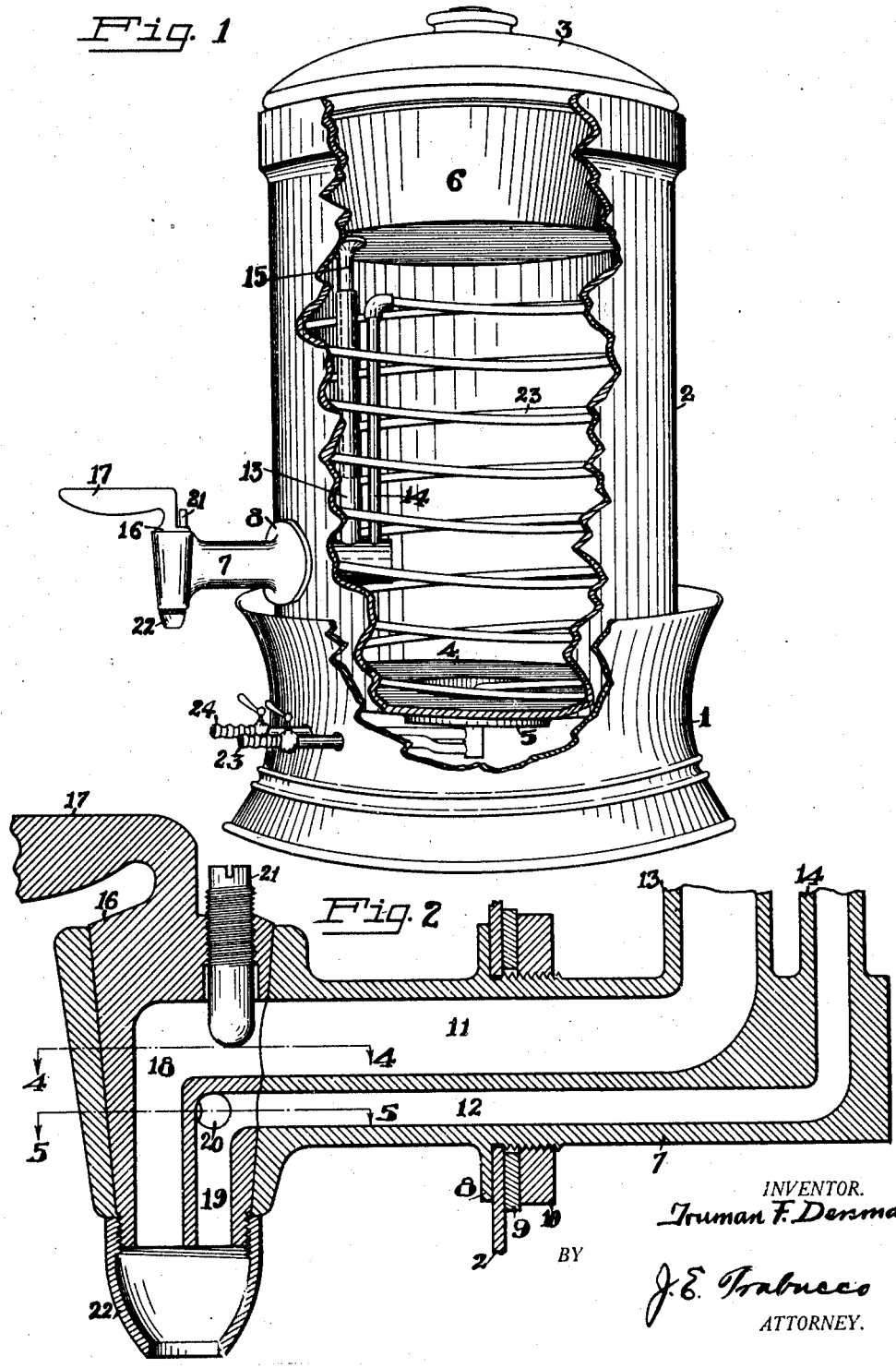

June 12, 1928.  1,672,930

T. F. DENMAN

FRUIT JUICE DISPENSER

Filed April 29, 1927   3 Sheets-Sheet 3

INVENTOR.
Truman F Denman
BY
J. E. Fabrisco
ATTORNEY.

Patented June 12, 1928.

1,672,930

UNITED STATES PATENT OFFICE.

TRUMAN F. DENMAN, OF SAN FRANCISCO, CALIFORNIA, ASSIGNOR OF ONE-HALF TO FRANK J. HEMMERLE, OF SAN FRANCISCO, CALIFORNIA.

FRUIT-JUICE DISPENSER.

Application filed April 29, 1927. Serial No. 187,561.

This invention relates to improvements in fruit juice or syrup dispensers having a construction adapted for use in cooling, mixing and dispensing a quantity of fruit juice and water.

An object of my invention is to provide a fruit juice dispenser of novel construction adapted to contain separated quantities of water, fruit juice and ice.

Another object of my invention is to provide a fruit juice dispenser having novel means embodied therein for mixing and dispensing a quantity of fruit juice and water.

Another object of my invention is to provide a fruit juice dispenser having novel means embodied therein for regulating the amounts of fruit juice and water dispensed thereby.

Another object of my invention is to provide a fruit juice dispenser having embodied therein a movable container for fruit juice which may be swung outwardly to permit the convenient insertion of ice within the dispenser.

Another object of my invention is to provide a fruit juice dispenser having a construction which permits the convenient removal of the various parts thereof for cleaning or other purposes.

Another object of my invention is to provide a fruit juice dispenser adapted to contain quantities of fruit juice, water and ice, which has means embodied therein for withdrawing a mixture of fruit juice and water or a quantity of water.

Other objects more or less apparent will present themselves or will be particularly pointed out in the following description.

In the accompanying drawings:

Fig. 1 is a perspective view of a fruit juice dispenser constructed in accordance with my invention, showing a part thereof broken away;

Fig. 2 is a vertical sectional view of the part of the fruit juice dispenser used for withdrawing and mixing quantities of fruit juice and water;

Fig. 3 is a perspective view of the fruit juice dispenser, showing a part thereof broken away and the container for holding fruit juice in an outwardly swung position;

Fig. 4 is a sectional view taken on the line 4—4 of Fig. 2;

Fig. 5 is a sectional view taken on the line 5—5 of Fig. 2;

Figure 6:
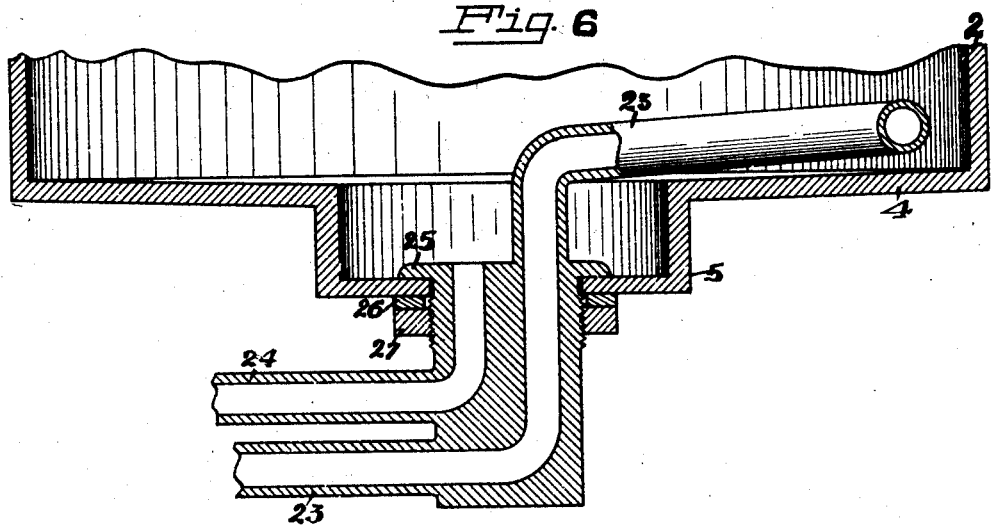
Fig. 6 is a sectional view of the lower part of the ice container, showing the various pipes connected to the same.
Figure 7:
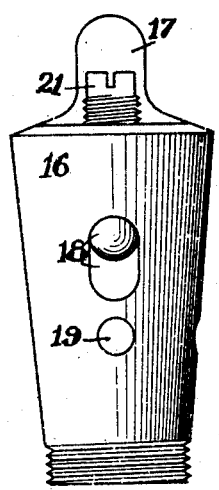
Fig. 7 is a rear side view of the means used for regulating the flow of fruit juice and water from the containers located inside the dispenser.
Figure 8:
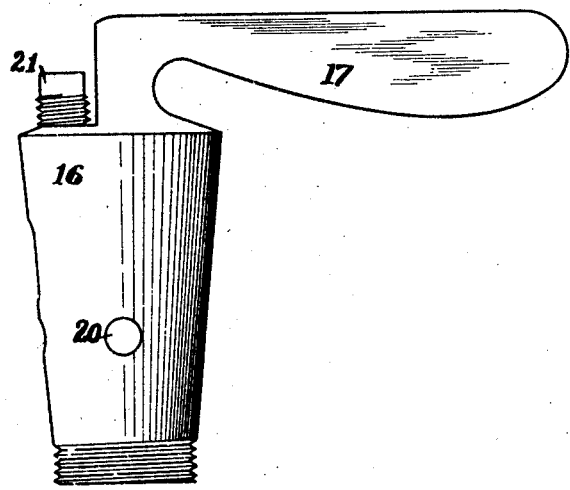
Fig. 8 is a side view of the means shown in Fig. 7.

Referring to the drawings, the numeral 1 represents a base having an inwardly extending projecting part located on its inside surface, upon which a jar 2 is adapted to rest. The jar 2 is provided with a removable cover 3 and a bottom 4, the latter having a downwardly disposed portion 5 located centrally therein within which certain fittings are fastened, as will be later described.

Removably located inside jar 2 near the upper part thereof is a pan 6 for holding a quantity of fruit juice, syrup or other liquid preparation, the said pan being suitably supported inside the top part of the said jar 2.

Extending through the side wall of the jar 2, is a pipe 7 having an outwardly projecting flanged portion 8 which is adapted to contact with the outer surface of the said side wall. The pipe 7 is held securely in place by a washer 9 and a lock nut 10, the latter being adapted to screw against the washer through threads located on the said pipe. Extending longitudinally through the pipe 7 are two openings 11 and 12 which connect respectively with upwardly extending pipes 13 and 14, the said pipes being suitably secured to the upper side of the pipe 7 or formed integrally therewith. Suitably secured to the bottom of the pan 6 with its lower part movably located inside the pipe 13 in such a manner as to form a telescope connection, is a tube 15, which completes the means for permitting the fruit juice located in the said pan to flow downwardly into the opening 11.

The outwardly disposed end of the pipe 7 assumes a general conical shape, and has a vertically extending opening of a similar shape located therein. Movably located in the said vertical opening, with its sides closely fitting the side walls of the said opening, is a regulating member 16, having a handle 17 located on its top part. The regulating member 16 is provided with two openings 18 and 19 which extend horizontally and downwardly at right angles, and are adapted to register with the openings 11 and 12 respectively of pipe 7 when the regulating member 16 is turned in an open position as shown in Fig. 2. The regulating member is also provided with a third opening 20 which extends through the said member in the same plane and at approximately right angles to the horizontally extending part of opening 19.

Extending downwardly through the top of the regulating member 16 with its end projecting into the horizontally extending part of the opening 18, is a set screw 21 which upon being screwed inwardly or outwardly, regulates the amount of fruit juice passing through the opening 18.

Screwed on the lower end of the regulating member 16 is a cup shaped member 22 having an opening located in its bottom side through which solutions flowing through openings 18 and 19 may finally pass.

Extending from a suitable source of supply, through the side of the base 1 and upwardly through the downwardly disposed portion 5 of the bottom 4 to which it is suitably secured, is a water pipe 23, which extends spirally in an upward direction adjacent but separated from the inside surface of side walls of the jar 2. The end of the water pipe 23 is suitably connected to the pipe 14, and a quantity of water is permitted to flow through the said pipe 23, the pipe 14, the opening 12 in pipe 7, through either of the openings 19 and 20 located in regulating member, and out through the cup shaped member 22.

Extending through the side of the base and connecting with the inside of the jar 2, is a drain pipe 24, which is suitably secured to the downwardly disposed portion 5 of the bottom 4.

As shown in Fig. 6, the water pipe 23 and the drain pipe 24 may be formed integrally with an outwardly disposed flanged portion 25 resting on upper surface of the downwardly disposed portion 5, and a washer 26 and lock nut 27 located around the two pipes may hold them securely in place.

In operation, the cover 3 is removed from the jar 2 and the pan 6 is moved upwardly and outwardly as shown in Fig. 3, so that a quantity of ice may be inserted within the jar. After the pan is filled with fruit juice or other desirable composition, the water pipe 23 is suitably connected to a supply of water or other fluid which is under pressure. The fruit juice from the pan 6 flows downwardly through the tube 15 and the pipe 13 into the longitudinally extending opening 11 located in the pipe 7, and a quantity of water located in pipe 23 flows therethrough and into the longitudinally extending opening 12 located in the pipe 7. The ice which was inserted inside the jar 2 serves to chill both the water located in pipe 23 and the fruit juice located in the pan 6.

Upon turning the handle 17 of the regulating member 16 so that its openings 18 and 19 register respectively with openings 11 and 12 of pipe 7, quantities of fruit juice and water are permitted to flow into the cup shaped member 22 where they are thoroughly mixed before finally passing through the opening located therein.

If it is desired that only water be dispensed, the handle 17 is turned until the opening 20 in the regulating member registers with the opening 12 of pipe 7.

The faucet or regulating member may be conveniently dissembled by unscrewing the cup shaped member 22 from the regulating member 16, and then withdrawing the latter from the conical shaped opening located in the pipe 7.

The pan 6 may also be readily detached by pulling the same upwardly until the tube 15 becomes entirely disengaged from the pipe 13.

Although I have shown and described the preferred form my invention may assume, it is apparent to those skilled in the art that the same may be embodied in other forms equally as satisfactory as the one illustrated. I therefore desire my invention included broadly within the spirit of the appended claims.

Having described my invention, what I claim is:

1. A liquid solution dispenser comprising a container having a pan for holding a liquid solution and a water supplying pipe located therein, a faucet having a plurality of openings therethrough, means connecting the pan with one of the openings in the faucet, separate means connecting the water pipe with another of the said openings, a regulating member located in the faucet for regulating the amount of water and liquid solution passing through the openings, and a cup shaped member secured to the regulating member and movable therewith for mixing the water and the liquid solution passing through the openings in the faucet.

2. A liquid solution dispenser comprising a container having a pan for holding a quaitity of liquid solution and a water supplying pipe located therein, a faucet having a plurality of openings therein, a regulating member forming a part of the faucet having a plurality of openings extending therethrough, each of said openings being adapted to register with one of the openings located in the faucet, separate means connecting the pan and the water pipe with two of the openings in the faucet, adjustable means located in the regulating member for regulating the amount of liquid solution passing through one of the openings in the regulating member and a cup shaped member secured to the regulating member for receiving the water and liquid solution passing through the regulating member.

3. In a liquid solution dispenser a faucet, comprising a pipe having a plurality of openings extending therethrough, a regulating member movably located in one end of the pipe having a plurality of openings extending therethrough, each of said openings being adapted to register with one of the openings in the pipe, and adjustable means located in the regulating member for regulating the amount of liquid solution passing through one of the openings.

4. In a faucet, a regulating member movably supported within a casing, an opening extending through the regulating member, a separate opening extending through the regulating member, and a third opening extending partly through the regulating member and joining one of the first mentioned openings at a point near the central part of the regulating member.

5. In a faucet, a regulating member movably supported within a casing, an opening extending through the regulating member, a separate opening extending through the regulating member, a third opening extending partly through the regulating member and joining one of the first mentioned openings at a point near the central part of the regulating member, and means adjustably located in the regulating member for regulating the amount of fluid passing through one of the openings.

6. In a faucet, a regulating member movably supported within a casing, an opening extending through the regulating member, a separate opening extending through the regulating member, a third opening extending partly through the regulating member and joining one of the first two mentioned openings at a point near the central part of the regulating member, a cup shaped member attached to the regulating member for receiving liquid passing through the said openings, and means adjustably attached to the regulating member for regulating the amount of liquid passing through one of the said openings.

7. A fruit juice dispenser comprising a container, a pan removably located inside the container, a faucet, and means connecting the pan and the faucet, comprised of one pipe movably located inside another, whereby the pan may be removed from the inside of the container and swung outwardly without disconnecting it from the faucet.

TRUMAN F. DENMAN.